(12) United States Patent
Giterman et al.

(10) Patent No.: US 11,893,259 B2
(45) Date of Patent: Feb. 6, 2024

(54) STORAGE SYSTEM CONFIGURED WITH STEALTH DRIVE GROUP

(71) Applicant: EMC IP Holding Company LLC, Hopkinton, MA (US)

(72) Inventors: Boris Giterman, Beer Sheva (IL); Yaniv Sagron, HaDarom (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/143,358

(22) Filed: Jan. 7, 2021

(65) Prior Publication Data
US 2022/0214813 A1    Jul. 7, 2022

(51) Int. Cl.
*G06F 3/06*       (2006.01)
*G06F 21/57*      (2013.01)

(52) U.S. Cl.
CPC ............ *G06F 3/065* (2013.01); *G06F 3/0635* (2013.01); *G06F 3/0689* (2013.01); *G06F 21/572* (2013.01); *G06F 3/0604* (2013.01)

(58) Field of Classification Search
None
See application file for complete search history.

(56) References Cited

U.S. PATENT DOCUMENTS

| 8,375,385 B1 * | 2/2013 | Harel ................... G06F 8/654 717/173 |
| 10,296,252 B1 * | 5/2019 | Han .................... G06F 11/2069 |
| 2004/0236958 A1 * | 11/2004 | Teicher ............... G06F 21/6218 713/193 |
| 2005/0063217 A1 | 3/2005 | Shiraishi et al. |
| 2007/0150651 A1 * | 6/2007 | Nemiroff ............ G06F 11/1456 714/E11.12 |

(Continued)

OTHER PUBLICATIONS

StackExchange, operating system requiring two or more users to access admin account, Oct. 8, 2019, https://security.stackexchange.com/questions/219296/operating-system-requiring-two-or-more-users-to-access-admin-account (Year: 2019).*

(Continued)

*Primary Examiner* — Arpan P. Savla
*Assistant Examiner* — Edmund H Kwong
(74) *Attorney, Agent, or Firm* — Ryan, Mason & Lewis, LLP

(57) ABSTRACT

A storage system comprises a plurality of storage devices, and is configured to establish a production drive group comprising a first subset of the storage devices, using a first firmware-level configuration process, and to establish a stealth drive group comprising a second subset of the storage devices, using a second firmware-level configuration process, the storage devices of the stealth drive group thereby being separated at a firmware level of the storage system from the storage devices of the production drive group. The storage system is further configured to copy data of one or more logical storage volumes from the production drive group to the stealth drive group, and responsive to completion of the copying of the data of the one or more logical storage volumes from the production drive group to the stealth drive group, to initiate a firmware-level reconfiguration process for the storage devices of the stealth drive group.

20 Claims, 4 Drawing Sheets

(56) References Cited

U.S. PATENT DOCUMENTS

| | | | |
|---|---|---|---|
| 2008/0034019 A1* | 2/2008 | Cisler | G06F 11/1458 |
| 2010/0138932 A1* | 6/2010 | Chou | G06F 21/74 |
| | | | 726/28 |
| 2010/0332813 A1* | 12/2010 | Rothman | G06F 9/4401 |
| | | | 711/163 |
| 2015/0019800 A1* | 1/2015 | Ramirez | G06F 8/654 |
| | | | 711/103 |
| 2016/0246587 A1* | 8/2016 | Uchiyama | G06F 8/65 |
| 2018/0095904 A1* | 4/2018 | Bunker | G06F 13/102 |
| 2019/0317682 A1 | 10/2019 | Li et al. | |

OTHER PUBLICATIONS

VMWare, Why Use Resource Pools, May 31, 2019, https://docs.vmware.com/en/VMware-vSphere/7.0/com.vmware.vsphere.resmgmt.doc/GUID-AA95D1D1-55C0-419D-9E1A-C523C138CC65.html (Year: 2019).*

Solarwinds Documentation for Network Configuration Manager, Simultaneous firmware upgrade operations, Oct. 2020 (Year: 2020).*

U.S. Appl. No. 16/671,824 filed in the name of Lior Kamran et al. filed Nov. 1, 2019, and entitled "Storage System Capacity Expansion Using Mixed-Capacity Storage Devices."

U.S. Appl. No. 16/693,858 filed in the name of Doron Tal filed Nov. 25, 2019, and entitled "Storage System with Prioritized RAID Rebuild."

U.S. Appl. No. 16/793,163 filed in the name of Yosef Shatsky et al. filed Feb. 18, 2020, and entitled "Storage System with Efficient Data and Parity Distribution Across Mixed-Capacity Storage Devices."

U.S. Appl. No. 16/852,632 filed in the name of Yosef Shatsky filed Apr. 20, 2020, and entitled "Storage System Configured to Guarantee Sufficient Capacity for a Distributed RAID Rebuild Process."

U.S. Appl. No. 16/902,890 filed in the name of Yosef Shatsky filed Jun. 16, 2020, and entitled "Storage System Configured to Guarantee Sufficient Capacity for a Distributed RAID Rebuild Process."

* cited by examiner

STORAGE SYSTEM CONFIGURED WITH STEALTH DRIVE GROUP

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt using parity information, typically in response to a storage device failure or other type of failure within the storage system. For example, a RAID 6 arrangement uses "dual parity" and can recover from simultaneous failure of two storage devices of the storage system. These and other RAID arrangements provide redundancy for stored data, with different types of RAID arrangements providing different levels of redundancy. Storage systems that utilize such RAID arrangements are typically configured to perform a rebuild process after detection of a storage device failure, and once the rebuild process is completed, the storage system can sustain additional failures. In these and other types of storage systems, it can be difficult to provide adequate security protections for clones or other high-value copies of data in the storage system. For example, although encryption can be used to protect a clone from unauthorized access, it cannot protect the clone from malicious destruction. Accordingly, improved techniques are needed for protecting clones and other high-value copies of data in a storage system.

SUMMARY

Illustrative embodiments provide techniques for implementing one or more stealth drive groups for storing clones or other high-value copies of data in a storage system. The one or more stealth drive groups not only protect the clones or other high-value copies from being accessed by a malicious attacker, but also protect the clones or other high-value copies from being destroyed by the malicious attacker. In some embodiments, a given clone protected using a stealth drive group comprises a "gold copy" clone of one or more logical storage volumes. Production versions of the one or more logical storage volumes are illustratively stored in one or more production drive groups. The one or more stealth drive groups are securely separated or "fenced off" from the one or more production drive groups, illustratively using a firmware-level configuration construct of the storage system.

In one embodiment, a storage system comprises a plurality of storage devices. The storage system is configured to establish a production drive group comprising a first subset of the storage devices, using a first firmware-level configuration process, and to establish a stealth drive group comprising a second subset of the storage devices, using a second firmware-level configuration process, the storage devices of the stealth drive group thereby being separated at a firmware level of the storage system from the storage devices of the production drive group. The storage system is further configured to copy data of one or more logical storage volumes from the production drive group to the stealth drive group, and responsive to completion of the copying of the data of the one or more logical storage volumes from the production drive group to the stealth drive group, to initiate a firmware-level reconfiguration process for the storage devices of the stealth drive group.

In some embodiments, completion of the firmware-level reconfiguration process for the storage devices of the stealth drive group renders the copied data stored in those storage devices temporarily inaccessible within the storage system.

For example, completion of the firmware-level reconfiguration process for the storage devices of the stealth drive group illustratively results in those storage devices being removed from the stealth drive group.

An additional firmware-level reconfiguration process may be subsequently initiated for the storage devices that were previously part of the stealth drive group in order to render the copied data stored in those storage devices once again accessible within the storage system. For example, the additional firmware-level reconfiguration process for the storage devices that were previously part of the stealth drive group illustratively results in those storage devices being made part of the production drive group.

Numerous other arrangements are possible. For example, in some embodiments, the additional firmware-level reconfiguration process for the storage devices that were previously part of the stealth drive group involves returning those storage devices back to the stealth drive group, or placing them in an additional drive group, such as a clone drive group, in which the storage devices will be accessible within the storage system.

In some embodiments, copying data of one or more logical storage volumes from the production drive group to the stealth drive group illustratively comprises generating a clone of the one or more logical storage volumes of the production drive group in the stealth drive group, with the clone of the one or more logical storage volumes comprising a point-in-time full copy of the one or more logical storage volumes.

In some embodiments, establishing the production drive group comprising the first subset of the storage devices, using the first firmware-level configuration process, comprises forming a first system resources pool comprising the first subset of the storage devices.

In such an embodiment, establishing the stealth drive group comprising the second subset of the storage devices, using the second firmware-level configuration process, illustratively comprises forming a second system resources pool, different than the first system resources pool, comprising the second subset of the storage devices.

The first firmware-level configuration process in some embodiments more particularly comprises obtaining a first configuration file, installing the first configuration file in the storage system, and updating firmware of the storage system based at least in part on the first configuration file. Similarly, the second firmware-level configuration process in some embodiments comprises obtaining a second configuration file different than the first configuration file, installing the second configuration file in the storage system, and updating firmware of the storage system based at least in part on the second configuration file. The installing and the updating are illustratively required to be performed under control of respective first and second distinct personnel subject to respective first and second distinct authentication processes.

The storage system in some embodiments is implemented as a distributed storage system comprising a plurality of storage nodes, each storing data in accordance with a designated RAID arrangement, although it is to be appreciated that a wide variety of other types of storage systems can be used in other embodiments. The RAID arrangement in some embodiments can comprise at least one parity RAID arrangement supporting recovery from a failure of at least one of the plurality of storage devices, such as a RAID 5 arrangement supporting recovery from a failure of a single one of the plurality of storage devices, or a RAID 6 arrangement supporting recovery from simultaneous failure of up to two of the storage devices. Distributed RAID arrangements can additionally or alternatively be used. Various combinations of parity RAID and/or non-parity RAID can also be used.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
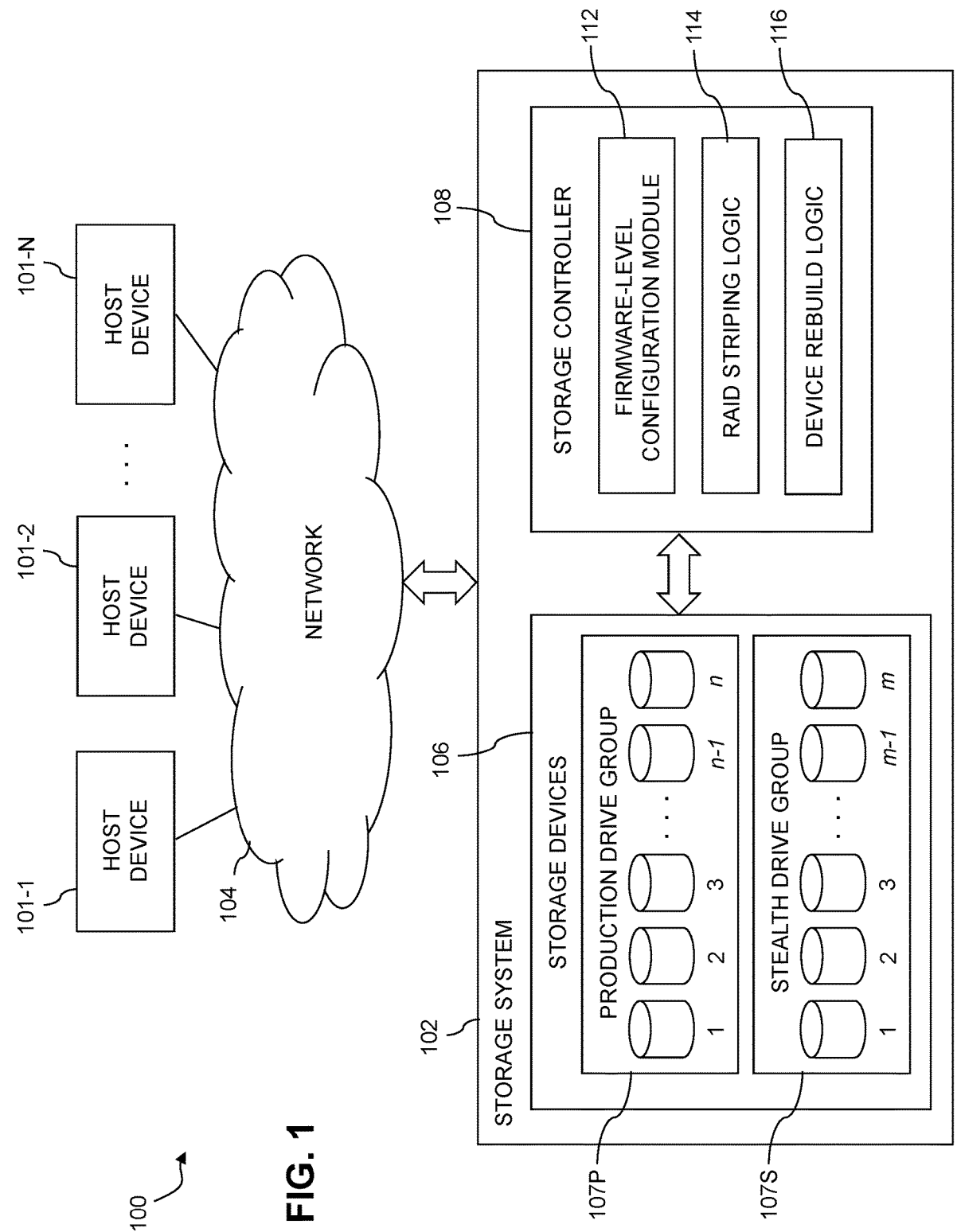
FIG. 1 is a block diagram of an information processing system comprising a storage system configured to implement stealth drive groups in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with one or more users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of one or more logical storage volumes of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 configured to store data of a plurality of storage volumes. The storage volumes illustratively comprise respective logical units (LUNs) or other types of logical storage volumes. The term "storage volume" as used herein is intended to be broadly construed, and should not be viewed as being limited to any particular format or configuration.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, HDDs can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage system 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell Technologies. Other types of MPIO drivers from other driver vendors may be used.

The storage system 102 in this embodiment stores data across the storage devices 106 in multiple distinct drive groups, including at least one production drive group 107P and at least one stealth drive group 107S. In other embodiments, there may be more than one production drive group 107P and/or more than one stealth drive group 107S. The production drive group 107P includes a first subset of the storage devices 106, and is illustratively configured in storage system 102 using a first firmware-level configuration process. The stealth drive group 107S includes a second subset of the storage devices 106, and is illustratively configured in storage system 102 using a second firmware-level configuration process, such that the storage devices of the stealth drive group 107S are thereby separated at a firmware level of the storage system 102 from the storage devices of the production drive group. Such storage devices 106 are also referred to herein as storage drives, and may include, for example, HDDs, SDDs or other types of storage drives, in any combination. The terms "production drive group" and "stealth drive group" as used herein are therefore intended to be broadly construed, so as to encompass a wide variety of different arrangements of storage drives or other storage devices.

In the present embodiment, the production drive group 107P comprises n storage devices, and the stealth drive group comprises m storage devices, wherein n and m are integer values and may but need not be equal.

As will be described in more detail below, the stealth drive group 107S is utilized in illustrative embodiments to securely store one or more clones or other high-value copies of data of one or more logical storage volumes in the storage system 102. The stealth drive group 107S is advantageously configured not only to protect the clones or other high-value copies from being accessed by a malicious attacker, but also to protect the clones or other high-value copies from being destroyed by the malicious attacker. In some embodiments, a given clone protected using a stealth drive group comprises a "gold copy" clone of one or more logical storage volumes. Production versions of the one or more logical storage volumes are illustratively stored in the production drive group 107P. The stealth drive group 107S is securely separated or "fenced off" from the production drive group 107P, illustratively using a firmware-level configuration construct of the storage system 102.

Accordingly, in some embodiments, data of one or more logical storage volumes of the storage system 102 is copied from the production drive group 107P to the stealth drive group 107S, illustratively as part of a cloning process executed by the storage controller 108. Such a cloning process generates a clone of one or more logical storage volume and securely stores that clone in a stealth drive group 107S.

The clone illustratively comprises a point-in-time (PIT) full copy of the one or more logical storage volumes, as opposed to one of a series of differential snapshots ("snaps") of the one or more logical storage volumes, although other types of arrangements using other types of high-value data copies are possible. It is therefore to be appreciated that use of clones or cloning processes is not required.

Responsive to completion of the copying of the data of the one or more logical storage volumes from the production drive group 107P to the stealth drive group 107S, a firmware-level reconfiguration process is initiated for the storage devices of the stealth drive group 107S. By way of example, the completion of the firmware-level reconfiguration process for the storage devices of the stealth drive group 107S renders the copied data stored in those storage devices temporarily inaccessible within the storage system 102.

In some embodiments, completion of the firmware-level reconfiguration process for the storage devices of the stealth drive group 107S more particularly results in those storage devices being removed from the stealth drive group 107S and thereby rendered inaccessible within storage system 102.

It should be noted that terms such as "responsive to completion" as used herein are intended to be broadly construed, and therefore should not be viewed as requiring an immediate response or other particular timing of a response to the stated condition.

An additional firmware-level reconfiguration process may be subsequently initiated for the storage devices that were previously part of the stealth drive group 107S in order to render the copied data stored in those storage devices once again accessible within the storage system 102. For example, the additional firmware-level reconfiguration process for the storage devices that were previously part of the stealth drive group 107S illustratively results in those storage devices being made part of the production drive group 107P. In other embodiments, the additional firmware-level reconfiguration process for the storage devices that were previously part of the stealth drive group 107S illustratively involves returning those storage devices back to the stealth drive group 107S, or placing them in an additional drive group, such as a clone drive group, in which the storage devices will be accessible within the storage system 102. Accordingly, the additional firmware-level reconfiguration process need not involve making those storage devices part of the production drive group 107P.

In some embodiments, establishing the production drive group 107P comprising the first subset of the storage devices 106, using the first firmware-level configuration process, comprises forming a first system resources pool (SRP) comprising the first subset of the storage devices 106. Additionally or alternatively, establishing the stealth drive group 107S comprising the second subset of the storage devices 106, using the second firmware-level configuration process, comprises forming a second SRP, different than the first SRP, comprising the second subset of the storage devices 106.

Each of the SRPs therefore has a different set of one or more storage devices that can be used to store one or more logical storage volumes. A given such logical storage volume is fully contained within the one or more storage drives of its SRP and cannot span multiple SRPs. Changes to SRP configurations generally must be authorized at a very high level within the organization in which the storage system 102 is deployed, and illustratively involve separate processes for installing configuration files and updating firmware based on those configuration files, possibly performed by separate personnel, each subject to a separate authentication process, to prevent malicious or otherwise unauthorized reconfigurations.

Examples of SRP techniques that can be used in illustrative embodiments include those implemented in the above-noted PowerMax™ storage arrays from Dell Technologies, although other types of SRP techniques can be used in other embodiments. Such SRP techniques are considered examples of what are more generally referred to herein as firmware-level configuration processes. Numerous alternative firmware-level configuration processes not involving SRPs can be used in other embodiments. It is therefore to be appreciated that illustrative embodiments do not require the use of SRPs.

In some embodiments, the first firmware-level configuration process illustratively comprises obtaining a first configuration file, installing the first configuration file in the storage system 102, and updating firmware of the storage system 102 based at least in part on the first configuration file.

Similarly, the second firmware-level configuration process illustratively comprises obtaining a second configuration file different than the first configuration file, installing the second configuration file in the storage system 102, and updating firmware of the storage system 102 based at least in part on the second configuration file.

Other types of firmware-level configuration constructs and processes can be used in other embodiments. Terms such as "firmware-level configuration" are therefore intended to be broadly construed, so as to encompass a wide variety of different arrangements for configuring a drive group utilizing firmware operations of a storage array or other storage system.

The above-noted installing and updating operations in some embodiments may be required to be performed under control of respective first and second distinct personnel subject to respective first and second distinct authentication processes. For example, a different engineer, administrator or other user may perform the updating of the firmware of the storage system 102 using a given installed configuration file, than the particular engineer, administrator or other user that installed the given configuration file in the storage system 102. Such role separation between the installing and updating operations provides enhanced security in some embodiments.

It should be noted that the different subsets of the storage devices 106 that are part of the production drive group 107P and the stealth drive group 107S need not be installed in separate "cages" or other types of disk array enclosures (DAEs) within the storage system 102. Accordingly, at least one of the storage devices 106 in the first subset of storage devices of production drive group 107P may be installed in the same DAE as at least one of the storage devices 106 in the second subset of storage devices of stealth drive group 107S. Numerous other arrangements are possible. These and other references to "disks" herein are intended to refer generally to storage devices, including SSDs, and should therefore not be viewed as limited to spinning magnetic media.

Additionally or alternatively, the storage devices of at least the second subset of storage devices 106 in some embodiments comprise respective self-encrypting drives (SEDs). In such an embodiment, an additional protected storage mechanism is implemented in the storage system 102 for storage of one or more keys required to access data stored on the SEDs. Again, an arrangement of this type involving SEDs with separate secure storage of the SED keys provides enhanced security in some embodiments.

In some embodiments, data is stored across the storage drives 106 of the production drive group 107P and the stealth drive group 107S using respective RAID arrangements each involving multiple ones of the storage devices 106. A given such RAID arrangement in the present embodiment illustratively comprises at least one RAID group. The RAID group illustratively comprises storage devices that each have the same capacity. Alternatively, the RAID group may comprise mixed-capacity storage devices, such as one or more storage devices having relatively low capacities and one or more storage devices having relatively high capacities. Such a RAID group is also referred to herein as a mixed-capacity RAID group. There are illustratively multiple distinct RAID groups within the storage system 102, each involving a different subset of the storage devices 106.

The term "RAID group" as used herein is intended to be broadly construed, so as to encompass, for example, a set of storage devices that are part of a given RAID arrangement, such as at least a subset of the storage devices 106 that are part of the RAID arrangement used for either the production drive group 107P or the stealth drive group 107S. Different RAID groups of different types may be used in the production and stealth drive groups 107P and 107S. Alternatively, the same RAID groups of the same type may be used in the production and stealth drive groups 107P and 107S. A given such RAID group comprises a plurality of stripes, each containing multiple stripe portions distributed over multiple ones of the storage devices 106 that are part of the RAID group.

An example RAID group used in the production drive group more specifically comprises a set of n of the storage devices 106 individually denoted 1 through n, respectively, with each such storage device being assumed for simplicity of illustration to have the same storage capacity. For example, the storage devices 1 through n may comprise respective SSDs each having a 500 GigaByte (GB) capacity, a 1 TeraByte (TB) capacity, or another capacity, although these and other particular storage device capacities referred to herein should not be viewed as limiting in any way. It is to be appreciated, however, that the disclosed techniques can be readily extended to other types of RAID groups, such as mixed-capacity RAID groups, each including a variety of different SSDs having different capacities.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controller 108 of the storage system 102. The storage devices 106 in the context of RAID arrangements herein are also referred to as "disks" or "drives." A given such RAID arrangement may also be referred to in some embodiments herein as a "RAID array."

The RAID arrangement used in production drive group 107P in this embodiment illustratively includes an array of n different "disks" denoted 1 through n, each a different physical storage device of the storage devices 106. Multiple such physical storage devices are typically utilized to store data of a given LUN or other logical storage volume in the storage system 102. For example, data pages or other data blocks of a given LUN or other logical storage volume can be "striped" along with its corresponding parity information across multiple ones of the disks in the RAID arrangement in accordance with RAID 5 or RAID 6 techniques.

As indicated previously, similar or different RAID arrangements can be used in stealth drive group 107S.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments.

As mentioned previously, in conventional storage systems, it can be difficult to provide adequate security protections for clones or other high-value copies of data in the storage system. For example, although encryption can be used to protect a clone from unauthorized access, it cannot protect the clone from malicious destruction.

The storage system 102 in the FIG. 1 embodiment advantageously overcomes these and other drawbacks of conventional practice by configuring stealth drive group 107S to store clones or other high-value copies of one or more logical storage volumes of the production drive group 107P, using the techniques disclosed herein.

The storage controller 108 of storage system 102 comprises firmware-level configuration module 112, RAID striping logic 114, and device rebuild logic 116.

The firmware-level configuration module 112 controls the configuration of production drive group 107P and stealth drive group 107S to include respective subsets of the storage devices 106, in the manner described previously. An example process that utilizes the firmware-level configuration module 112 in implementing secure storage of a clone using the stealth drive group 107S will be described below in conjunction with FIG. 2.

The RAID striping logic 114 determines an appropriate stripe configuration and a distribution of stripe portions across the storage devices 106 for a given RAID arrangement used in the production drive group 107P and/or in the stealth drive group 107S. The RAID striping logic 114 also performs parity computations for the given RAID arrangement, such as p parity computations of RAID 5, and/or p and q parity computations of RAID 6, using well-known techniques.

The device rebuild logic 116 is configured to control the performance of a RAID rebuild process in the storage system 102, illustratively in response to a failure of one or more of the storage devices 106, as will be described in more detail elsewhere herein.

The stripe portions of each of the stripes illustratively comprise a plurality of data blocks and one or more corresponding parity blocks. In the case of RAID 5, the parity blocks illustratively comprise row parity or p parity blocks, and are generated by RAID striping logic 114 using well-known RAID 5 techniques. In the case of RAID 6, the parity blocks illustratively comprise row parity or p parity blocks and diagonal parity or q parity blocks, and are generated by RAID striping logic 114 using well-known RAID 6 techniques.

The storage controller 108 utilizes its RAID striping logic 114 to establish a RAID arrangement comprising a plurality of stripes, with each of the plurality of stripes comprising a plurality of data blocks and one or more corresponding parity blocks, the data blocks and parity blocks being distributed across multiple ones of the storage devices 106 of a RAID group. It is to be appreciated, however, that non-parity RAID arrangements, or combinations of non-parity and parity RAID arrangements, can also be used.

Accordingly, in certain portions of the following description of illustrative embodiments, the term "blocks" will be used to refer generally to both data blocks and parity blocks. A RAID arrangement can therefore more generally comprise a plurality of stripes, with each of the plurality of stripes comprising a plurality of blocks, and the blocks being distributed across multiple ones of the storage devices.

The RAID arrangement in some embodiments comprises a distributed RAID arrangement in which a total number of blocks per stripe is less than a total number of the storage devices over which the blocks of the plurality of stripes are distributed. Distributed RAID generally refers to a type of RAID in which the width of the RAID stripe in blocks is smaller than the total number of storage devices over which the blocks are distributed. An important advantage of distributed RAID relative to other types of RAID is a shorter rebuild time. For example, in distributed RAID, spare blocks are illustratively distributed over all of the storage devices that store blocks of the RAID stripes, which reduces rebuild time as the writes performed in conjunction with rebuild are spread over all of those storage devices. Such distributed RAID arrangements can include parity RAID arrangements, non-parity RAID arrangements, or possibly combinations of multiple different RAID types.

The storage system 102 is illustratively further configured to detect a failure of at least one of the storage devices, and responsive to the detected failure, to initiate a rebuild process to reconstruct blocks of the one or more failed storage devices utilizing the blocks of other ones of the storage devices. The rebuild process utilizes spare blocks of respective ones of the non-failed storage devices.

In the case of parity RAID arrangements, the storage controller 108 detects a failure of at least one of the storage devices of the RAID arrangement, and responsive to the detected failure, reconstructs data blocks of that storage device utilizing the data blocks and parity blocks stored on other ones of the storage devices, with the reconstructed data blocks being stored in respective ones of the available spare blocks.

This reconstruction also utilizes what is more generally referred to herein as a "rebuild process" to reconstruct the data blocks of the failed storage device based on data blocks and parity blocks of the remaining storage devices of the RAID arrangement. The failure illustratively comprises a full or partial failure of one or more of the storage devices 106 in a RAID group of the RAID arrangement. A "remaining storage device" as that term is broadly used herein refers to a storage device that is not currently experiencing a failure. Thus, all of the storage devices of the RAID group other than the one or more storage devices for which a failure was detected are considered remaining storage devices of the RAID group. Such remaining storage devices are also referred to herein as "surviving storage devices," as these storage devices have survived the one or more detected failures.

The storage system 102 illustratively rebuilds stripe portions impacted by the one or more detected failures by reconstruction of impacted data blocks and parity blocks using non-impacted data blocks and parity blocks, using well-known techniques, such as the RAID 5 or RAID 6 techniques mentioned previously. This rebuild process continues until all of the stripe portions of the impacted stripes are fully rebuilt.

Numerous other types of RAID implementations can be used in illustrative embodiments herein, as will be appreciated by those skilled in the art, possibly using error correcting codes such as Reed Solomon codes or other types of codes that are known to those skilled in the art. The term "parity" as used herein is therefore intended to be broadly construed, so as to encompass these and other types of information suitable for use in recovering from at least one failure in at least one storage device.

Additional details regarding examples of techniques for storing data in RAID arrays such as the RAID arrangements of the FIG. 1 embodiment are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein. For example, these patents provide example techniques for computing parity blocks and performing rebuild processes using such parity blocks, although numerous other known techniques can be used.

An example of an algorithm that implements a stealth drive group such as stealth drive group 107S in storage system 102 will now be described.

In this example, it is assumed that it is desirable to store within the storage system 102 a clone of one or more logical storage volumes, and to prevent access to that clone. Such a clone is illustratively a point-in-time full copy of the one or more logical storage volumes, and is an example of what is also referred to herein as a "high-value copy" of the data, illustratively one that would be committed to a virtual tape library (VTL), a tape archive (TAR), cloud-based storage or other secure backup storage location.

The clone in some embodiments serves as what is also referred to herein as a "gold copy" of the data, as it is known to be correct as of the point-in-time for which it was generated. It provides a full and separate copy of the data in order to protect against cyber-attacks such as ransomware or other types of malware, physical corruption, data loss due to bugs, operational error etc. Such a clone is distinct from an incremental copy, also referred to herein as a differential snapshot or "snap," which only captures changed data relative to a previous snap. In some embodiments, clones can be generated quickly on an enterprise storage array and do not impact handling of production IO operations. Once such a clone is generated, it is generally desirable to provide it with a very high level of protection.

The present example algorithm protects the clone by "fencing off" the storage devices used to store its data, at a firmware level closest to a physical level of those storage devices, in a manner that advantageously renders the clone inaccessible within the storage system 102, and therefore highly secure and protected not only against cyber-attacks but also against malicious physical destruction.

The example algorithm in the present embodiment includes the following steps, although other steps can be used in other embodiments:

1. Configure a production drive group to include a first subset of the storage devices 106. Such configuration illustratively involves utilizing a firmware-level configuration process to deploy drive configuration boundaries at a firmware level of the storage system 102, closest to a physical level of the storage devices 106. For example, an SRP configuration process of the type described previously may be used. Once a given storage drive is placed in such a drive group, it cannot be removed from that drive group without performing a firmware-level reconfiguration process.

2. Configure a stealth drive group to include a second subset of the storage devices 106. Again, such configuration illustratively involves utilizing a firmware-level configuration process to deploy drive configuration boundaries at a firmware level of the storage system 102, closest to a physical level of the storage devices 106, possibly using an SRP configuration process. Again, once a given storage drive is placed in such a drive group, it cannot be removed from that drive group without performing a firmware-level reconfiguration process. Although the storage devices of the production and stealth drive groups may be physically close to one another, such as in the same cage or other DAE, from a configuration standpoint the drives in different drive groups are effectively invisible to one another.

3. Assume that the production drive group includes one or more LUNs or other logical storage devices, and that it is desirable to create a clone of the one or more logical storage devices. Accordingly, a cloning process is initiated, with the resulting clone to be stored on the storage devices of the stealth drive group. Such a clone therefore illustratively comprises one or more logical storage devices, separate from the one or more logical storage devices from which it was generated. The data of the one or more logical storage devices of the production drive group is copied to one or more corresponding logical storage devices of the stealth drive group as part of the cloning process.

4. After completion of the cloning process, the storage system 102 initiates a firmware-level reconfiguration process in which the storage devices of the stealth drive group are illustratively "unconfigured" and thereby removed from that drive group. The clone stored on those storage devices thereby becomes inaccessible within the storage system 102, and accordingly is provided with a very high level of protection from malicious activity. Such an arrangement effectively implements a "lock-box" for the clone in which its data is hidden within the storage system 102 from the host devices 101 and other outside entities, as well as from other drive groups such as the production drive group.

5. In order to access the clone at a later time, an additional reconfiguration process is initiated to move the storage drives that were previously part of the stealth drive group into the production drive group. Other reconfiguration arrangements can be used to make the clone accessible. For example, the storage drives that were previously part of the stealth drive group can be reconfigured as a new production drive group separate from the previous production drive group.

Such an algorithm is illustratively executed by the storage controller 108 in storage system 102, utilizing its firmware-level configuration module 112.

It is to be appreciated that this particular algorithm, like others described herein, is presented by way of illustrative example only, and can be varied in other embodiments. For example, certain steps can be performed at least in part in parallel with other steps in other embodiments. Also, additional or alternative steps can be used in other embodiments, as well as different drive group and firmware-level configuration arrangements.

For example, in order to further enhance the protection provided to the clone data, the storage drives of the stealth drive group, after storage of the clone therein is complete, and in conjunction with the firmware-level reconfiguration of Step 4, can be designated as read-only storage devices, by placing them in a read-only mode. Thus, an attacker attempting to corrupt the clone would not only have to locate the effectively hidden storage devices, but would also have to change those storage devices from read-only mode to read/write mode, an operation which would typically require additional access rights.

Additionally or alternatively, the storage devices of the stealth drive group can be configured as respective SEDs in order to provide additional protections, as described above, with a similar "lock-box" arrangement or other secure storage mechanism being used to protect the keys of the SEDs.

As indicated previously, the above-described techniques relating to production drive group 107P and stealth drive group 107S are illustratively implemented at least in part by the storage controller 108, utilizing its firmware-level configuration module 112 and RAID striping logic 114. A rebuild process utilizing data blocks and parity blocks to recover from one or more storage device failures is illustratively implemented at least in part by the storage controller 108, utilizing its device rebuild logic 116.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a DAE of the storage node.

A RAID group in some embodiments is established for a particular one of the storage nodes of a distributed implementation of storage system 102. The storage devices associated with the particular one of the storage nodes are illustratively part of a DAE of that storage node, although other storage device arrangements are possible. Each such storage device illustratively comprises an SSD, HDD or other type of storage drive. Similar arrangements can be implemented for each of one or more other ones of the storage nodes, although distributed implementations using multiple storage nodes are not required.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 3 and 4.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, drive groups 107, storage controller 108, firmware-level configuration module 112, RAID striping logic 114, and device rebuild logic 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which implements a process for securely storing a clone utilizing a stealth drive group in an illustrative embodiment. The process illustratively comprises an algorithm implemented at least in part by the storage controller 108 and one or more of its components 112, 114 and 116. As noted above, the storage devices 106 in some embodiments are more particularly referred to as "drives" and may comprise, for example, SSDs, HDDs, hybrid drives or other types of drives. A plurality of storage devices, which may be of the same capacity or of various mixed capacities, over which a given RAID arrangement is implemented illustratively comprises what is generally referred to herein as a RAID group.

Figure 2:
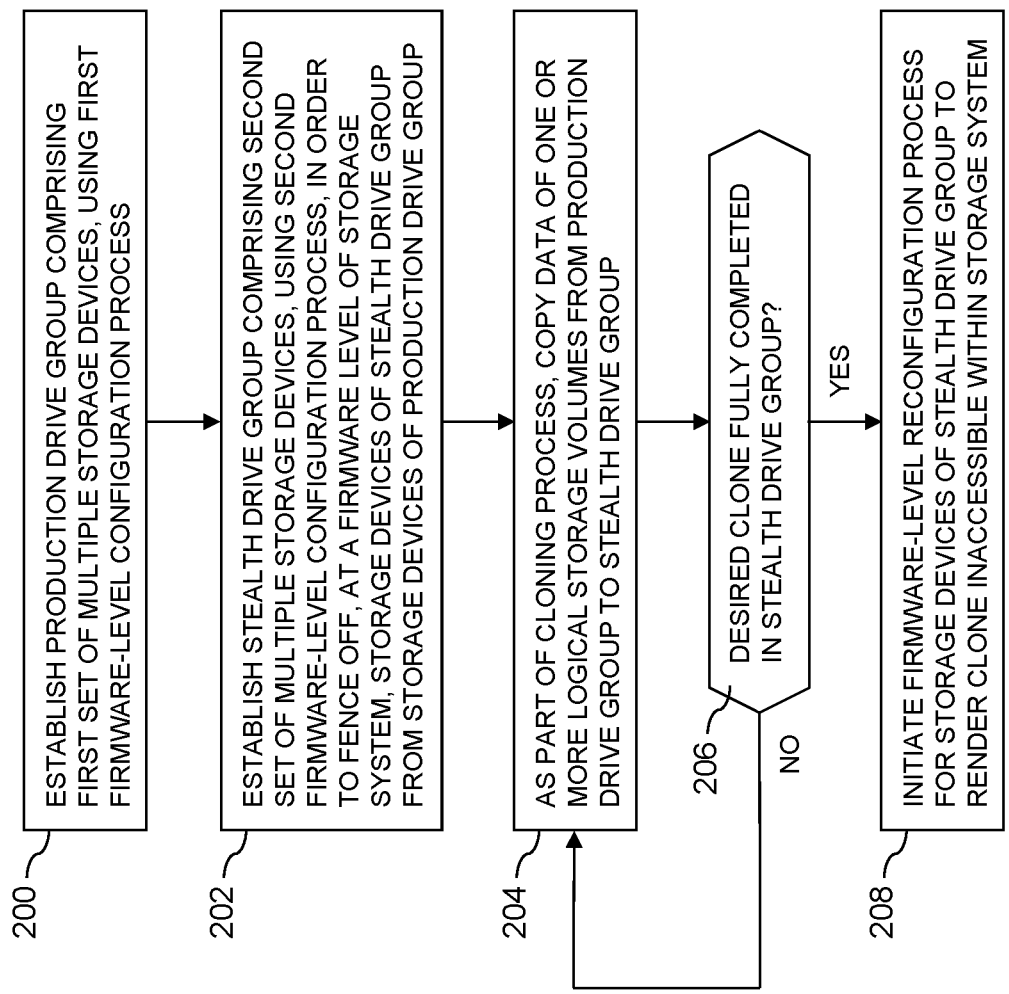
FIG. 2 is a flow diagram of a process for securely storing a clone utilizing a stealth drive group in an illustrative embodiment.

The process as illustrated in FIG. 2 includes steps 200 through 208, and is described in the context of storage system 102 but is more generally applicable to a wide variety of other types of storage systems each comprising multiple storage devices. The process is illustratively performed under the control of the storage controller 108, utilizing firmware-level configuration module 112 and RAID striping logic 114. Thus, the FIG. 2 process can be viewed as an example of an algorithm performed at least in part by the components 112 and 114. Other examples of such algorithms implemented by a storage controller or other storage system components will be described elsewhere herein.

In step 200, the storage system 102 establishes production drive group 107P comprising a first set of multiple storage devices, using a first firmware-level configuration process carried out by firmware-level configuration module 112. The first set of multiple storage devices illustratively comprises the n storage devices shown in FIG. 1, which represent a first subset of the storage devices 106 of the storage system 102.

In step 202, the storage system 102 establishes stealth drive group 107S comprising a second set of multiple storage devices, using a second firmware-level configuration process carried out by firmware-level configuration module 112. The second set of multiple storage devices illustratively comprises the m storage devices shown in FIG. 1, which represent a second subset of the storage devices 106 of the storage system 102. The storage devices of the stealth drive group 107S are illustratively "fenced off" from the storage devices of the production drive group 107P, at a firmware level of the storage system 102.

Although not explicitly shown in the figure, it is assumed that the storage system 102 further implements respective RAID arrangements for the production drive group 107P and the stealth drive group 107S, using its RAID striping logic 114, in the manner previously described. Also, one or more logical storage volumes are assumed to be stored in the production drive group 107P in accordance with its RAID arrangement, and utilized by one or more of the host devices 101. Finally, it is further assumed that it is desirable to create a clone of the one or more logical storage volumes stored in the production drive group 107P, to serve as a backup copy or for other purposes. For example, a cloning process can be initiated by a backup application running on one or more of the host devices 101.

In step 204, as part of the above-noted cloning process, data of the one or more logical storage volumes to be cloned is copied from the production drive group 107P to the stealth drive group 107S.

In step 206, a determination is made as to whether or not the desired clone is fully complete in the stealth drive group 107S. If the clone is complete, the process moves to step 208, and otherwise returns to step 204 to continue copying data of the one or more logical storage volumes as indicated.

In step 208, which is reached after the clone is fully complete in the stealth drive group 107S, a firmware-level reconfiguration process is initiated for the storage devices of the stealth drive group 107S, in order to render the clone inaccessible within the storage system 102. Such an arrangement provides a very high level of security for the clone, as it cannot be accessed within the storage system 102. For example, the clone is completely inaccessible to the host devices 101 or any applications running thereon, until such time as a subsequent firmware-level reconfiguration process is performed to make the clone accessible, possibly by moving the storage devices that were previously part of the stealth drive group 107S to the production drive group 107P, such that those storage devices are accessible to the host devices 101.

The steps of the FIG. 2 process are shown in sequential order for clarity and simplicity of illustration only, and certain steps can at least partially overlap with other steps. For example, the establishment of the production and stealth drive groups in steps 200 and 202 can be performed at least in part in parallel.

Different instances of the process of FIG. 2 can be performed for different portions of the storage system 102, such as different storage nodes of a distributed implementation of the storage system 102.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for secure storage of a clone or other high-value data copy using a stealth drive group. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for secure storage of clones or other high-value data copies for respective different sets of one or more logical storage volumes within a given storage system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in storage system 102 that is configured to perform the steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms.

Illustrative embodiments of a storage system with functionality for securely storing clones or other high-value data copies using stealth drive groups as disclosed herein can provide a number of significant advantages relative to conventional arrangements.

For example, some embodiments implement stealth drive groups that can not only protect the clones or other high-value copies from being accessed by a malicious attacker, but also protect the clones or other high-value copies from being destroyed by the malicious attacker. Thus, illustrative embodiments can prevent malicious destruction of clones or other high-value copies of the data of one or more logical storage volumes, such as a "gold copy" clone of one or more logical storage volumes.

The one or more stealth drive groups in these and other embodiments are securely separated or "fenced off" from the one or more production drive groups, illustratively using a firmware-level configuration construct of the storage system.

Such embodiments can provide a very high level of security for the cloned data, by essentially rendering the cloned data inaccessible within the storage system, absent performance of a subsequent firmware-level reconfiguration process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement with functionality for configuring and utilizing stealth drive groups in a storage system will now be described in greater detail with reference to FIGS. 3 and 4. Although described in the context of system 100, these platforms may also be used to implement at least portions of other information processing systems in other embodiments.

Figure 3:
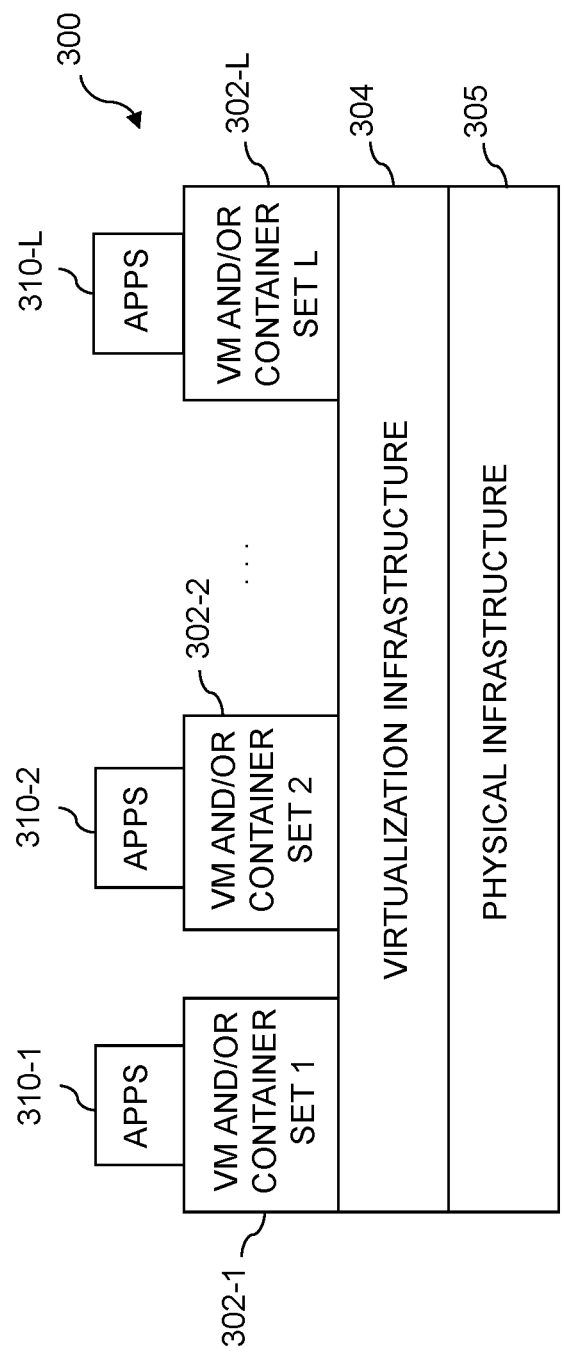
FIGS. 3 and 4 show examples of processing platforms that may be utilized to implement at least a portion of an information processing system in illustrative embodiments.
Figure 4:
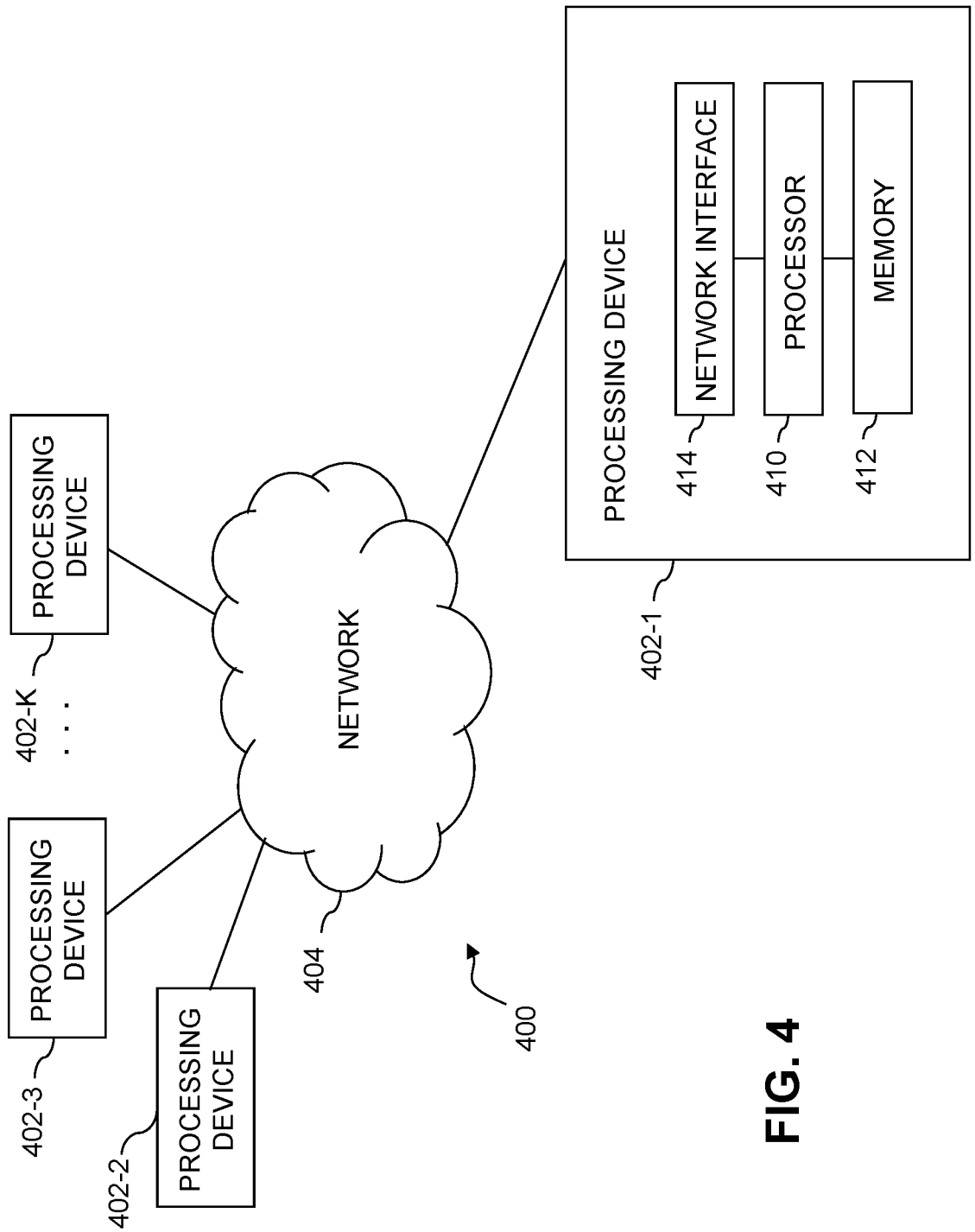

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. Such implementations can provide at least portions of the functionality described herein using one or more processes running on a given one of the VMs. For example, each of the VMs can implement modules, logic instances and/or other components supporting the disclosed functionality for configuration and utilization of stealth drive groups in the storage system 102.

A hypervisor platform may be used to implement a hypervisor within the virtualization infrastructure 304. Such a hypervisor platform may comprise an associated virtual infrastructure management system. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system. Such implementations can also provide at least portions of the functionality described herein. For example, a container host device supporting multiple containers of one or more container sets can implement modules, logic instances and/or other components supporting the disclosed functionality for configuration and utilization of stealth drive groups in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for configuring and utilizing stealth drive groups in a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, production and stealth drive groups, firmware-level configuration modules and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage system being configured:
to establish a production drive group comprising a first subset of the storage devices, using a first firmware-level configuration process based at least in part on a first configuration file;
to establish a stealth drive group comprising a second subset of the storage devices, using a second firmware-level configuration process different than the first firmware-level configuration process, the second firmware-level configuration process being based at least in part on a second configuration file different than the first configuration file, the first firmware-level configuration process being performed at least in part in parallel with the second firmware-level configuration process, the storage devices of the stealth drive group thereby being separated at a firmware level of the storage system from the storage devices of the production drive group;
to copy data of one or more logical storage volumes from the production drive group to the stealth drive group; and
responsive to completion of the copying of the data of the one or more logical storage volumes from the production drive group to the stealth drive group, to initiate a firmware-level reconfiguration process for the storage devices of the stealth drive group;
wherein establishing the production drive group comprising the first subset of the storage devices, using the first firmware-level configuration process, comprises forming a first system resources pool comprising the first subset of the storage devices;
wherein establishing the stealth drive group comprising the second subset of the storage devices, using the second firmware-level configuration process, comprises forming a second system resources pool, different than the first system resources pool, comprising the second subset of the storage devices, the second subset of the storage devices used for forming the second system resources pool comprising storage devices that have not previously been used for forming any portion of the first system resources pool; and
wherein the first and second subsets of storage devices comprising the respective production drive group and stealth drive group comprise respective distinct and non-overlapping subsets of the storage devices of the storage system;
the copied data of the one or more logical storage volumes as stored in the stealth drive group thereby being stored in its entirety on one or more storage devices that are different than any of those utilized to store the data of the one or more logical storage volumes in the production drive group.

2. The apparatus of claim 1 wherein the data of the one or more logical storage volumes is stored in at least one of the production drive group and the stealth drive group utilizing a redundant array of independent disks (RAID) arrangement comprising a plurality of stripes, with each of the plurality of stripes comprising a plurality of blocks, the blocks being distributed across multiple ones of the storage devices.

3. The apparatus of claim 2 wherein the RAID arrangement comprises a distributed RAID arrangement in which a total number of blocks per stripe is less than a total number of the storage devices over which the blocks of the plurality of stripes are distributed.

4. The apparatus of claim 2 wherein the RAID arrangement comprises at least one parity RAID arrangement supporting recovery from a failure of at least one of the plurality of storage devices and wherein a given one of the stripes comprises a plurality of data blocks and one or more parity blocks.

5. The apparatus of claim 1 wherein completion of the firmware-level reconfiguration process for the storage devices of the stealth drive group renders the copied data stored in those storage devices temporarily inaccessible within the storage system.

6. The apparatus of claim 1 wherein copying data of one or more logical storage volumes from the production drive group to the stealth drive group comprises generating a clone of the one or more logical storage volumes of the production drive group in the stealth drive group, the clone of the one or more logical storage volumes comprising a point-in-time full copy of the one or more logical storage volumes.

7. The apparatus of claim 1 wherein the first firmware-level configuration process comprises:
   obtaining the first configuration file;
   installing the first configuration file in the storage system; and
   updating firmware of the storage system based at least in part on the first configuration file.

8. The apparatus of claim 7 wherein the second firmware-level configuration process comprises:
   obtaining the second configuration file;
   installing the second configuration file in the storage system; and
   updating firmware of the storage system based at least in part on the second configuration file.

9. The apparatus of claim 7 wherein the installing and the updating are required to be performed under control of respective first and second distinct personnel subject to respective first and second distinct authentication processes.

10. The apparatus of claim 5 wherein completion of the firmware-level reconfiguration process for the storage devices of the stealth drive group results in those storage devices being removed from the stealth drive group.

11. The apparatus of claim 10 wherein an additional firmware-level reconfiguration process is initiated for the storage devices that were previously part of the stealth drive group in order to render the copied data stored in those storage devices once again accessible within the storage system.

12. The apparatus of claim 11 wherein the additional firmware-level reconfiguration process for the storage devices that were previously part of the stealth drive group results in those storage devices being made part of the production drive group.

13. The apparatus of claim 1 wherein at least one of the storage devices in the first subset of storage devices is installed in a same disk array enclosure as at least one of the storage devices in the second subset of storage devices.

14. The apparatus of claim 1 wherein the storage devices of at least the second subset of storage devices comprise respective self-encrypting drives and wherein an additional protected storage mechanism is implemented in the storage system for storage of one or more keys required to access data stored on the self-encrypting drives.

15. A computer program product comprising a non-transitory processor-readable storage medium having stored therein program code of one or more software programs, wherein the program code when executed by a processor of a storage system comprising a plurality of storage devices, causes the storage system:
   to establish a production drive group comprising a first subset of the storage devices, using a first firmware-level configuration process based at least in part on a first configuration file;
   to establish a stealth drive group comprising a second subset of the storage devices, using a second firmware-level configuration process different than the first firmware-level configuration process, the second firmware-level configuration process being based at least in part on a second configuration file different than the first configuration file, the first firmware-level configuration process being performed at least in part in parallel with the second firmware-level configuration process, the storage devices of the stealth drive group thereby being separated at a firmware level of the storage system from the storage devices of the production drive group;
   to copy data of one or more logical storage volumes from the production drive group to the stealth drive group; and
   responsive to completion of the copying of the data of the one or more logical storage volumes from the production drive group to the stealth drive group, to initiate a firmware-level reconfiguration process for the storage devices of the stealth drive group;
   wherein establishing the production drive group comprising the first subset of the storage devices, using the first firmware-level configuration process, comprises forming a first system resources pool comprising the first subset of the storage devices;
   wherein establishing the stealth drive group comprising the second subset of the storage devices, using the second firmware-level configuration process, comprises forming a second system resources pool, different than the first system resources pool, comprising the second subset of the storage devices, the second subset of the storage devices used for forming the second system resources pool comprising storage devices that have not previously been used for forming any portion of the first system resources pool; and
   wherein the first and second subsets of storage devices comprising the respective production drive group and stealth drive group comprise respective distinct and non-overlapping subsets of the storage devices of the storage system;
   the copied data of the one or more logical storage volumes as stored in the stealth drive group thereby being stored in its entirety on one or more storage devices that are different than any of those utilized to store the data of the one or more logical storage volumes in the production drive group.

16. The computer program product of claim 15 wherein completion of the firmware-level reconfiguration process for the storage devices of the stealth drive group renders the copied data stored in those storage devices temporarily inaccessible within the storage system.

17. A method for use in a storage system comprising a plurality of storage devices, the method comprising:
   establishing a production drive group comprising a first subset of the storage devices, using a first firmware-level configuration process based at least in part on a first configuration file;
   establishing a stealth drive group comprising a second subset of the storage devices, using a second firmware-level configuration process different than the first firmware-level configuration process, the second firmware-level configuration process being based at least in part on a second configuration file different than the first configuration file, the first firmware-level configuration process being performed at least in part in parallel with the second firmware-level configuration process, the storage devices of the stealth drive group thereby being separated at a firmware level of the storage system from the storage devices of the production drive group;
   copying data of one or more logical storage volumes from the production drive group to the stealth drive group; and responsive to completion of the copying of the data of the one or more logical storage volumes from the production drive group to the stealth drive group, initiating a firmware-level reconfiguration process for the storage devices of the stealth drive group;

wherein establishing the production drive group comprising the first subset of the storage devices, using the first firmware-level configuration process, comprises forming a first system resources pool comprising the first subset of the storage devices;

wherein establishing the stealth drive group comprising the second subset of the storage devices, using the second firmware-level configuration process, comprises forming a second system resources pool, different than the first system resources pool, comprising the second subset of the storage devices, the second subset of the storage devices used for forming the second system resources pool comprising storage devices that have not previously been used for forming any portion of the first system resources pool; and wherein the first and second subsets of storage devices comprising the respective production drive group and stealth drive group comprise respective distinct and non-overlapping subsets of the storage devices of the storage system;

the copied data of the one or more logical storage volumes as stored in the stealth drive group thereby being stored in its entirety on one or more storage devices that are different than any of those utilized to store the data of the one or more logical storage volumes in the production drive group.

18. The method of claim 17 wherein completion of the firmware-level reconfiguration process for the storage devices of the stealth drive group renders the copied data stored in those storage devices temporarily inaccessible within the storage system.

19. The method of claim 17 wherein the production drive group is implemented utilizing a first RAID arrangement of a first RAID type over the first subset of storage devices and the stealth drive group is implemented utilizing a second RAID arrangement of a second RAID type over the second subset of storage device, the second RAID arrangement of the second RAID type being different than the first RAID arrangement of the first RAID type.

20. The method of claim 17 wherein the storage devices of at least the second subset of storage devices comprise respective self-encrypting drives and wherein an additional protected storage mechanism is implemented in the storage system for storage of one or more keys required to access data stored on the self-encrypting drives.

* * * * *